(12) United States Patent
Yang

(10) Patent No.: US 10,038,810 B1
(45) Date of Patent: Jul. 31, 2018

(54) IMAGE SCANNING SYSTEM

(71) Applicant: Microtek International Inc., Hsinchu (TW)

(72) Inventor: Jin-Chun Yang, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 15/415,142

(22) Filed: Jan. 25, 2017

(51) Int. Cl.
*H04N 1/04* (2006.01)
*H04N 1/024* (2006.01)
*H04N 1/031* (2006.01)
*H04N 1/10* (2006.01)

(52) U.S. Cl.
CPC ......... *H04N 1/02409* (2013.01); *H04N 1/031* (2013.01); *H04N 1/1061* (2013.01); *H04N 2201/0081* (2013.01)

(58) Field of Classification Search
CPC ... H04N 1/1061; H04N 1/031; H04N 1/02409
USPC ................................................. 358/497, 474
See application file for complete search history.

(56) References Cited

U.S. PATENT DOCUMENTS

| | | | | |
|---|---|---|---|---|
| 6,459,510 B1 * | 10/2002 | Brewer | ..................... | H04N 1/10 358/474 |
| 7,843,611 B2 * | 11/2010 | Albahri | ................... | H04N 1/195 348/207.99 |
| 8,274,712 B2 * | 9/2012 | Sheng | ................ | H04N 1/02865 358/474 |

* cited by examiner

*Primary Examiner* — Houshang Safaipour
(74) *Attorney, Agent, or Firm* — Muncy, Geissler, Olds & Lowe, P.C.

(57) ABSTRACT

An image scanning system comprises an image capture unit, a transmission unit, an adapter, a first driving unit and a second driving unit. The image scanning system uses the first driving unit connected with the adapter and the transmission unit to drive the image capture unit to move along an optical axis to instantly vary the distance between the image capture unit and the object. The image scanning system can realize high-precision submicron-scale transmission in simpler structure and lower cost.

8 Claims, 2 Drawing Sheets

IMAGE SCANNING SYSTEM

BACKGROUND OF THE INVENTION

1. Field of the Invention

The present invention relates to an image scanning system, particularly to an image scanning system able to undertake submicron-scale transmission.

2. Description of the Prior Art

During scanning an object, an image capture unit needs to move along an optical axis (i.e. along the height direction) to undertake autofocusing and capture a clear image of the object. Therefore, the precision in which the image capture unit is moved along the optical axis would influence the image sharpness and imaging quality.

The traditional image scanning systems use a piezoelectric motor or a linear motor to achieve submicron-scale (0.1-1 um-scale) transmission in high precision. However, they are complicated in structure and expensive in cost.

Therefore, the manufacturers are eager to develop a low-cost and high-precision image scanning system.

SUMMARY OF THE INVENTION

The present invention provides an image scanning system, which uses a first driving unit to connect an adapter and a transmission unit and drive an image capture unit to move along an optical axis at least in a precision of submicron scale, whereby to achieve submicron-scale transmission in a simpler structure and a lower cost.

In one embodiment, the image scanning system of the present invention comprises an image capture unit, a transmission unit, an adapter, a first stepper motor and a second stepper motor. The image capture unit includes a charge-coupled device, a complementary metal oxide semiconductor, or a contact image sensor. The image capture unit captures an image of an object. The transmission unit includes a shifting shaft and a rotation member. The shifting shaft is connected with the image capture unit; the rotation member is connected with the shifting shaft. A rotation generated by the rotation member controls a displacement of the shifting shaft along an optical axis of the image capture unit. The first stepper motor includes a driving shaft connected with the adapter, rotating the rotation member to drive the image capture unit to move along the optical axis. The second stepper motor is connected with the image capture unit and drives the image capture unit and the object to move with respect to each other along a scanning direction, wherein the scanning direction is vertical to the optical axis.

Below, embodiments are described in detail in cooperation with the attached drawings to make easily understood the objectives, technical contents, characteristics and accomplishments of the present invention.

DESCRIPTION OF THE PREFERRED EMBODIMENT

Figure 1:
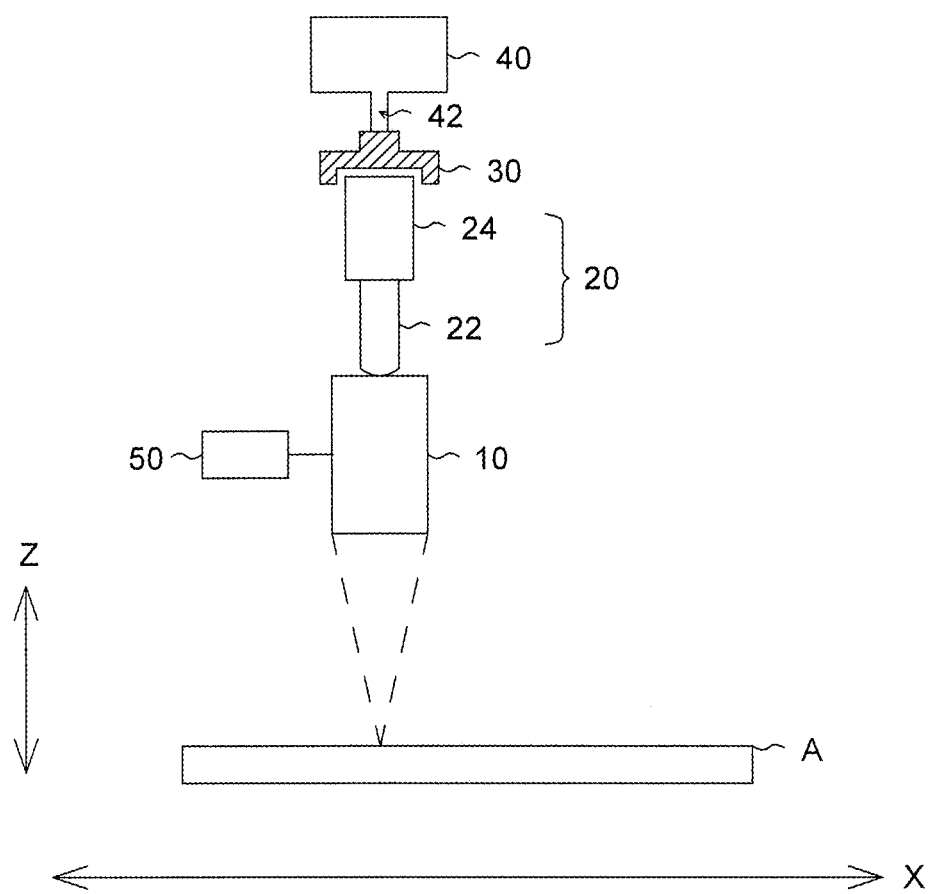
FIG. 1 is a diagram schematically showing an image scanning system according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1. In one embodiment, the image scanning system of the present invention comprises an image capture unit 10, a transmission unit 20, an adapter 30, a first driving unit 40 and a second driving unit 50. The image capture unit 10 captures an image of an object A. The object A, for example, has a height, and the height direction is parallel to an optical axis Z of the capture unit 10.

The transmission unit 20 includes a shifting shaft 22 and a rotation member 24. The shifting shaft 22 is connected with the image capture unit 10; the rotation member 24 is connected with the shifting shaft 22. The rotation member 24 generates a rotation to control a displacement of the shifting shaft 22 along the optical axis Z of the image capture unit 10. The displacement is of a submicron scale (0.1-1 um scale) or below. In one embodiment, the transmission unit 20 includes a micrometer; for example, the transmission unit 20 is a micrometer caliper. It is particularly noted herein: the present invention adopts a high-precision transmission unit 20 to drive the image capture unit 10 to move along the optical axis Z; therefore, the present invention can use merely a simple and low-cost structure to realize high-precision transmission.

One end of the adapter 30 is connected with the rotation member 24; another end of the adapter 30 is connected with the first driving unit 40. In one embodiment, the adapter 30 is tightly coupled to the rotation member 24. For example, the corresponding surfaces of the adapter 30 and the rotation member 24 are closely intercalated; it may be that the adapter 30 is inserted into the rotation member 24 or that the rotation member 24 is inserted into the adapter 30. In one embodiment, the adapter 30 sleeves the rotation member 24 or is sleeved by the rotation member 24, and the adapter 30 rotates the rotation member 24.

The first driving unit 40 includes a driving shaft 42 connected with the adapter 30, rotating the rotation member 24 to drive the image capture unit 10 to move along the optical axis Z, whereby to instantly vary the distance between the image capture unit 10 and the object A during a scanning process. Thus is optimized the image sharpness and imaging quality of the image capture unit 10. In one embodiment, the first driving unit 40 includes a step motor. However, the present invention is not limited by the embodiment. As mentioned above, the traditional scanning system does not adopt a step motor but uses a piezoelectric motor or a linear motor. Contrarily, in one embodiment, the present invention realizes submicron-scale transmission, using a step motor 40 to control a micrometer 20 through the adapter 30 and drive the image capture unit 10 to move along the optical axis Z.

The second driving unit 50 is connected with the image capture unit 10, driving the image capture unit 10 and the object A to move with respect to each other along a scanning direction X, which is vertical to the optical axis Z. In one embodiment, the second driving unit 50 includes a step motor, whereby to reduce the cost. However, the present invention is not limited by the embodiment.

Figure 2:
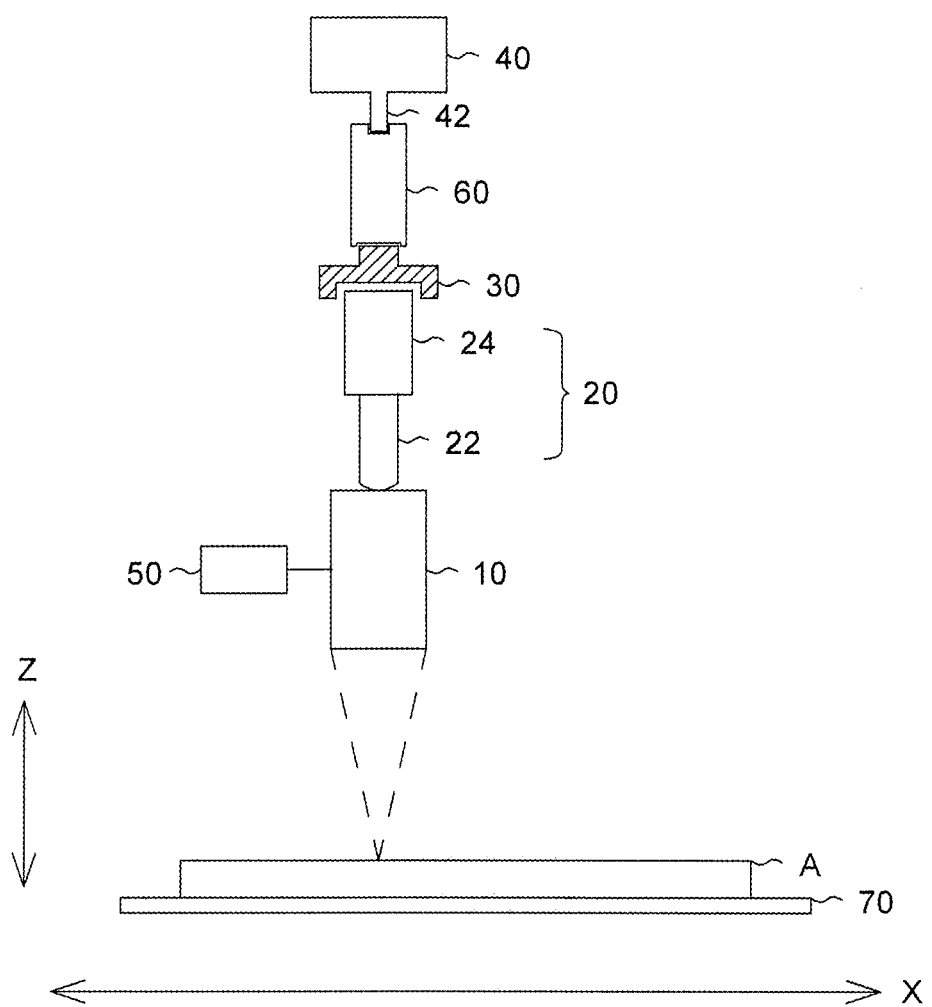
FIG. 2 is a diagram schematically showing an image scanning system according to another embodiment of the present invention.

Refer to FIG. 2. In order to increase the control precision of the transmission unit 20, the adapter 30 includes a shaft coupling unit 60. One end of the shaft coupling unit 60 is connected with the adapter 30; another end of the shaft coupling unit 60 is connected with the driving shaft 42 of the first driving unit 40. The shaft coupling unit 60 can eliminate the axial deviation between the shifting shaft 22 of the transmission shaft 20 and the driving shaft 42 of the first driving shaft 40.

In one embodiment, the image scanning system of the present invention further comprises a platform 70 for carrying the object A. In one embodiment, the image scanning system of the present invention further comprises a light source (not shown in the drawings) providing light to illuminate the object A. The image capture unit 10 captures the light reflected from the object A to generate an image of the object A. In one embodiment, the platform 70 has a light-permeable material, and the object A and the image capture unit 10 are respectively disposed at two opposite sides of the platform 70, whereby is realized a transmission type image scanning system. In one embodiment, the image capture unit 10 includes a linear type light sensing element or a surface type light sensing element. For example, the image capture unit 10 includes a charge-coupled device, a complementary metal oxide semiconductor, or a contact image sensor. However, the present invention is not limited by the embodiments. The persons having ordinary knowledge in the art should be able to modify or vary the embodiments according to the specification without departing from the scope of the present invention.

In conclusion, the image scanning system of the present invention uses a first driving unit to control a transmission unit in a high precision (at least submicron scale) to drive an image capture unit to move along an optical axis, whereby to instantly vary the distance between the image capture unit and the object during a scanning process and enhance the image sharpness and imaging quality of the image capture unit. Thereby, the image scanning system of the present invention can realize high-precision submicron-scale transmission in a simpler structure and lower cost.

What is claimed is:

1. An image scanning system comprising
   an image capture unit comprising a charge-coupled device, a complementary metal oxide semiconductor, or a contact image sensor configured to capture an image of an object;
   a transmission unit including a micrometer which includes
      a shifting shaft connected with the image capture unit; and
      a rotation member connected with the shifting shaft, wherein a rotation generated by the rotation member is configured to control a displacement of the shifting shaft along an optical axis of the image capture unit;
   an adapter connected with the rotation member;
   a first stepper motor including a driving shaft connected with the adapter and configured to rotate the rotation member to drive the image capture unit to move along the optical axis; and
   a second stepper motor connected with the image capture unit and configured to drive the image capture unit and the object to move with respect to each other along a scanning direction, wherein the scanning direction is vertical to the optical axis.

2. The image scanning system according to claim 1, wherein the adapter is tightly coupled to the rotation member.

3. The image scanning system according to claim 1, wherein the adapter sleeves the rotation member or is sleeved by the rotation member.

4. The image scanning system according to claim 1, wherein the adapter includes a shaft coupling unit, and wherein one end of the shaft coupling unit is connected with the adapter, and another end of the shaft coupling unit is connected with the driving shaft of the first stepper motor.

5. The image scanning system according to claim 1, wherein the transmission unit has submicron-scale precision.

6. The image scanning system according to claim 1, wherein the image capture unit includes a linear type light sensing element or a surface type light sensing element.

7. The image scanning system according to claim 1 further comprising a platform for carrying the object.

8. The image scanning system according to claim 7, wherein the platform includes a light-permeable material, and wherein the object and the image capture unit are respectively disposed at two opposite sides of the platform.

* * * * *